United States Patent
Colibaba-Evulet et al.

(10) Patent No.: US 6,968,693 B2
(45) Date of Patent: Nov. 29, 2005

(54) METHOD AND APPARATUS FOR REDUCING GAS TURBINE ENGINE EMISSIONS

(75) Inventors: Andrei Colibaba-Evulet, Clifton Park, NY (US); Michael John Bowman, Niskayuna, NY (US); Simon Ralph Sanderson, Clifton Park, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 131 days.

(21) Appl. No.: 10/667,041

(22) Filed: Sep. 22, 2003

(65) Prior Publication Data

US 2005/0061004 A1 Mar. 24, 2005

(51) Int. Cl.[7] ............................................... F02C 1/00
(52) U.S. Cl. ........................... 60/748; 60/737; 60/758
(58) Field of Search ....................... 60/758, 748, 737; 431/185; 239/419

(56) References Cited

U.S. PATENT DOCUMENTS

| | | | | |
|---|---|---|---|---|
| 3,915,387 | A | * | 10/1975 | Caruel et al. ................ 239/400 |
| 3,980,233 | A | * | 9/1976 | Simmons et al. ............ 239/400 |
| 5,564,270 | A | | 10/1996 | Kesseli et al. |
| 5,628,193 | A | | 5/1997 | Kington et al. |
| 5,899,075 | A | | 5/1999 | Dean et al. |
| 5,924,275 | A | | 7/1999 | Cohen et al. |
| 5,974,781 | A | | 11/1999 | Correa et al. |
| 6,125,625 | A | | 10/2000 | Lipinski et al. |
| 6,198,174 | B1 | | 3/2001 | Nims et al. |
| 6,345,505 | B1 | * | 2/2002 | Green .......................... 60/748 |
| 6,355,987 | B1 | | 3/2002 | Bixel |
| 6,367,262 | B1 | * | 4/2002 | Mongia et al. ................ 60/748 |
| 6,405,536 | B1 | | 6/2002 | Ho et al. |
| 6,415,594 | B1 | | 7/2002 | Durbin et al. |
| 6,502,400 | B1 | | 1/2003 | Freidauer et al. |
| 6,543,233 | B2 | | 4/2003 | Young et al. |
| 6,553,767 | B2 | | 4/2003 | Farmer et al. |
| 6,568,079 | B2 | | 5/2003 | Farmer et al. |
| 6,574,950 | B2 | | 6/2003 | Nash |
| 6,584,760 | B1 | | 7/2003 | Lipinski et al. |
| 6,609,377 | B2 | * | 8/2003 | Durbin et al. ................ 60/748 |
| 2005/0039456 | A1 | * | 2/2005 | Hayashi ........................ 60/737 |

* cited by examiner

*Primary Examiner*—Ehud Gartenberg
(74) *Attorney, Agent, or Firm*—Ann M. Agosti; Patrick K. Patnode

(57) ABSTRACT

A low emission turbine includes a reverse flow can-type combustor that generally includes a primary and secondary fuel delivery system that can be independently controlled to produce low CO, UHC, and NOx emissions at design set point and at conditions other than design set point. The reverse flow can-type combustor generally includes an annularly arranged array of swirler and mixer assemblies within the combustor, wherein each swirler and mixer in the array includes a primary and secondary fuel delivery system that can be independently controlled. Also disclosed herein is a can-type combustor that includes fluid passageways that perpendicularly impinge the outer surface of a heat shield. Processes for operating the can-type combustors are also disclosed.

11 Claims, 10 Drawing Sheets

METHOD AND APPARATUS FOR REDUCING GAS TURBINE ENGINE EMISSIONS

STATEMENT REGARDING FEDERALLY SPONSORED RESEARCH OR DEVELOPMENT

This invention was made with U.S. government support under Government Contract No.: DE-FC02-00CH11063. The U.S. government has certain rights in this invention.

BACKGROUND

This disclosure generally relates to gas turbine engines, and more particularly, to combustors for gas turbine engines.

Microturbines are small gas turbines typically used for on-site power generation. They operate on the same principle as a jet engine but can use a variety of commercially available fuels, such as natural gas, diesel, bio-diesel, gasoline, kerosene, propane, methane, digester gas, reformed fuels, products of gasification and the like. Microturbines have the ability to operate in grid-connected, stand-alone, and dual modes. Grid-connected mode generally allows the unit to operate parallel to the grid, providing base loading and peak shaving. Stand-alone mode generally allows the units to operate completely isolated from the grid. In dual mode, the units can switch between the two modes automatically.

Microturbines are generally applied as back-up or auxiliary power sources for office buildings, retail stores, small manufacturing plants, homes, and many other commercial facilities. These facilities have traditionally been powered by electric utilities via a grid of power distribution lines. Using microturbines, these facilities generate electrical power at their own sites, and avoid being solely dependent on conventional electrical power grids and utilities. Microturbines may also generate power at less cost and/or more reliably than the electrical power provided over the grid by electrical power utilities.

Air pollution concerns worldwide have led to stricter emissions standards. These standards regulate the emission of oxides of nitrogen (NOx), unburned hydrocarbons (UHC), and carbon monoxide (CO) generated as a result of gas turbine engine operation. In particular, nitrogen oxide is formed within a gas turbine engine as a result of the high combustor flame temperatures during operation.

A conventional microturbine generally includes a compressor, a recuperator, a combustor, and a turbine. Air is compressed in the compressor, heated in the recuperator, mixed with fuel, burned in the combustor and then expanded in the turbine to generate hot, high-pressure gases that drive the turbine. The turbine exhaust gases are generally ducted through the recuperator to transfer heat to the inlet air and thereby increase the energy of the air-fuel mixture in the combustion chamber. There are generally two types of combustors employed with gas turbines, e.g., can-type combustors and annular-type combustors, each having characteristic advantages and disadvantages relating to emissions and operability.

Can-type combustors typically consist of a cylindrical can-type liner inserted into a transition piece with multiple fuel-air premixers positioned at the head end of the liner. Although this system is practical and easy to assemble, prior art can-type combustors have several inherent disadvantages for achieving ultra-low emissions and maximum operability. Prior art can-type combustors are relatively lengthy and provide a long combustor residence time. During low load and/or low temperature operation, the levels of CO and UHC are minimized due to the long combustor residence time. However, during high load and/or high temperature operation, diatomic nitrogen begins to react with combustion intermediate species (O-atoms, OH, etc), and NOx emissions grow in time. Therefore, the large residence time of the can-type combustor results in high NOx emissions during high-load and/or high temperature operation. In contrast to high load and/or high temperature operations, at lower pressures and similar flame temperatures, the CO levels increase significantly unless the residence time is increased. This is particularly important for operations on microturbines, which have much lower pressure ratios (typically around 4.0) than large machines. As a result, combustors need to be modified accordingly for implementation on recuperated microturbines.

FIG. 1 illustrates a prior art can-type combustor. The can-type combustor shown generally by reference numeral 2 includes a casing 4, premixing means 6, air inlet(s) 8, a can liner 10, a combustion chamber 12, an optional transition piece 14, and a nozzle 16. During the operation of prior art can-type combustor 2, combustion air enters in through air inlet(s) 8 along the direction of arrows A and enters into casing 4. Combustion air then enters premixing means 6 where it is mixed with fuel. The fuel-air mixture is then injected by premixing means 6 into combustion chamber 12 where it is combusted. After the fuel-air mixture is combusted it is exhausted through transition piece 14 and nozzle 16. As mentioned, one down side of the can combustor is its length. The combustion products flow from the upstream end of the combustion chamber through the entire chamber and enter into the transition piece until exiting through the nozzle. This results in a long combustor residence time and accordingly, during high temperature and/or high load operation, high levels of NOx emissions. However, the can-type combustor works well during low temperature and/or low load operation, as the long combustor residence time allows the CO and UHC to burn off (i.e., oxidize more completely) during this long period, resulting in low CO and UHC emission levels. In addition, particularly for microturbine combustors, the transition piece is usually not required since the combustor exit may be aligned with the scroll inlet and any leakage minimized via the use of a seal.

Annular-type combustors typically consist of multiple premixers positioned in rings directly upstream of the turbine nozzles in an annular fashion. The annular-type combustor is short in length and accordingly, has a relatively short combustor residence time. During high load and/or high temperature operation, the levels of NOx emissions are low due to the short combustor residence time in the short annular combustor. However, during low load and/or low temperature operation, the levels of carbon monoxide (CO) and unburned hydrocarbon (UHC) are large due to the short combustor residence time of the annular-type combustor, not allowing complete CO and UHC burnout (i.e., oxidation).

FIG. 2 depicts a prior art annular-type combustor, generally designated by reference numeral 50. As shown, a typical annular-type combustor 50 consists of a single flame tube, completely annular in form, which is contained in a continuous, circular inner and outer combustion casings 52, 54, respectively, without any separate interior burner cans. This construction provides the most effective mixing of fuel and air, and due to optimum burner surface area, maximum cooling of the combustion gases takes place. Due to its annular shape, the annular-type combustor has no need for a transition piece, making it much more compact than a can type combustor. As discussed earlier, one down side of the annular combustor when implemented for low-pressure ratio gas turbines is this short length. The combustor residence time is low, and accordingly, during low temperature and/or low load operation, high levels of CO and UHC emissions are present. In addition, one other important down side of annular combustors operation is the multitude of acoustic modes of the combustion system (transversal and longitudinal), which are especially prone to excitation in the case of lean premix flames, and may therefore result in high amplitude pressure fluctuations, generally at high loads. However, the annular combustor works well during high temperature or high load operation, as the short combustor residence time does not give the NOx emissions sufficient growth time, resulting in low levels of NOx emissions. Moreover, for microturbines, the use of radial flow turbomachinery is normal whereas the geometrical layout of an annular combustor is best suited for axial flow turbomachinery.

In microturbine engines, usually a lean premixed flame is employed. In can-type combustors for microturbines, this is achieved by using a premixer that performs a dual operation role for generating the premixed and diffusion flames. The latter is usually employed in conditions other than the design point (full speed load), where stabilization of a premixed lean flame is generally difficult to achieve. In annular type combustors, a circumferentially uniform array of premixers is employed. Furthermore, all of the premixers are operated similarly for achieving uniformity and good pattern factors. The result is that, in either premixer configuration (e.g., annular or can type,) higher emissions (whether it be CO and UFHC as in the case of annular type combustors or NOx as in the case of can-type combustors) occur at conditions other than the design set point and that no flexibility is permitted in either premixer configuration to operate the premixers independently at different fuel rates.

Accordingly, there is a need for quiet combustors that minimize emissions at low temperature and/or low load operation as well as well during high temperature or high load operation (i.e., emissions at design set point as well as emissions at operation conditions other than design set point).

BRIEF SUMMARY

Disclosed herein is a process and apparatus for reducing emissions in a gas turbine. In one embodiment, a reverse flow combustor for a gas turbine comprises a combustor casing comprising an elongated cylindrical combustor liner interiorly defining a combustion chamber and a reverse flow fluid passageway between the liner and the casing; a swirler and mixer assembly upstream from the combustion chamber, wherein the assembly comprises annularly arranged swirler and mixers, wherein each one of the swirler and mixers comprises a centerbody, an inner swirler attached to the centerbody, an outer swirler attached to the inner swirler and a shroud comprising an annularly tapered wall extending between each one of the swirler and mixers to the combustion chamber; a domeplate comprising a heat shield having an annular endbody intermediate the combustion chamber and the swirler and mixer assembly; a primary fuel delivery system comprising a fuel source in fluid communication with each one of the four swirler and mixers, wherein the primary fuel system is adapted to radially inject fuel into the inner and the outer swirler; and a secondary fuel delivery system comprising a fluid passageway defined by the annularly tapered wall of the shroud and an outer wall, wherein the fluid passageway is in fluid communication with the fuel source, wherein the primary and secondary fuel delivery system can be independently controlled for each one of the four swirler and mixers.

In accordance with another embodiment, the reverse flow combustor for a gas turbine comprises a combustor casing comprising an elongated cylindrical combustor liner interiorly defining a combustion chamber and a reverse flow fluid passageway between the liner and the casing, wherein the combustor liner comprises a plurality of openings about a primary combustion zone, and a plurality of openings radially disposed in the liner about a dilution zone of the combustion chamber; a swirler and mixer assembly upstream from the combustion chamber; and a domeplate intermediate the combustion chamber and the swirler and mixer assembly comprising a heat shield having an annular end body, wherein the domeplate further comprises a plurality of fluid openings to provide an airflow that impinges upon a an outer surface of the heat shield during operation of the gas turbine, wherein the plurality of openings radially disposed in the liner about the primary combustion zone provide a fluid flow that impinges on the outer surface of the heat shield during operation of the gas turbine.

A process for reducing NOx emissions in a gas turbine employing a can-type combustor comprising a plurality of swirler and mixer assemblies comprises independently operating a primary fuel delivery system to at least one of the plurality of swirler and mixer assemblies, wherein the primary fuel delivery system injects fuel into a swirler of the at least one swirler and mixer assemblies to operate at a different fuel to air equivalence ratio than the other swirler and mixer assemblies; and operating a secondary fuel delivery system to each one of the plurality of swirler and mixer assemblies, wherein the secondary fuel delivery system injects a fuel to combustion chamber via an opening disposed in a shroud surrounding each one of the plurality of swirler and mixer assemblies.

The above described and other features are exemplified by the following detailed description and figures.

BRIEF DESCRIPTION OF FIGURES

Referring now to the figures wherein like elements are numbered alike.

DETAILED DESCRIPTION

Disclosed herein is a gas turbine apparatus and process for reducing exhaust emissions, such as CO, NOx, and UHC emissions to acceptable levels over the full operating range of engine loads and ambient conditions. The gas turbine apparatus generally includes a reverse flow can-type combustor having an array of premixers, wherein the array of premixers can act independently of one another. By independently operating the array of premixers in a predetermined array pattern, lean premixed flames can advantageously be utilized at the design point as well as be used to control fuel equivalence ratios, ergo flame temperatures, so as to reduce deleterious exhaust emissions at conditions other than the design point. Moreover, the independent use of the array of premixers as will be described herein improves on the dynamics of the gas turbine due to the extra degrees of freedom associated with the independent operation of the array of premixers.

Figure 1:
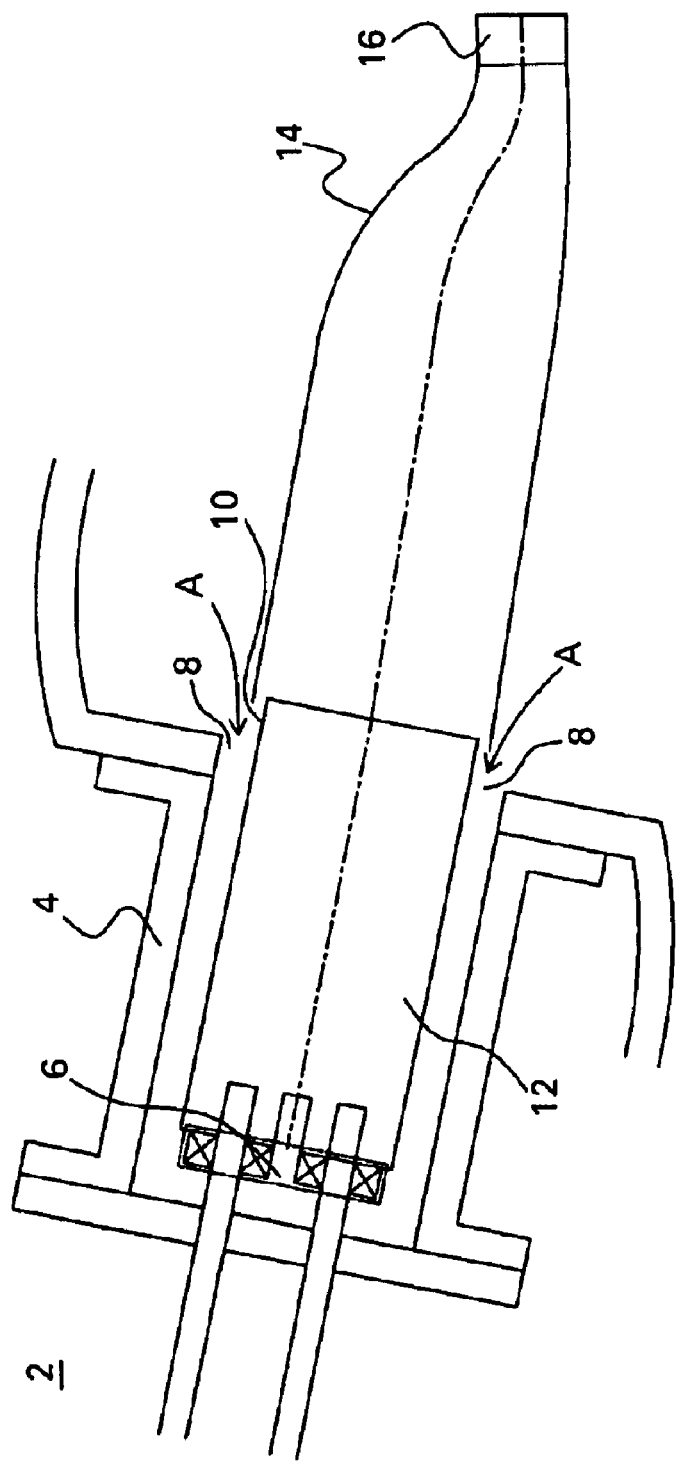
FIG. 1 is a cross sectional side view of a prior art can-type combustor.
Figure 2:
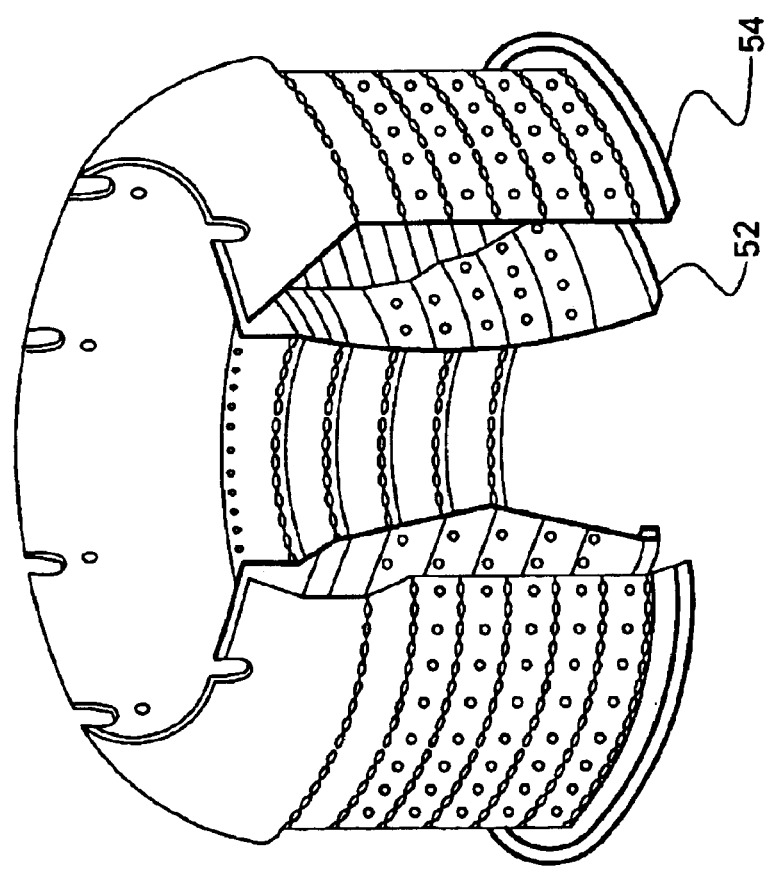
FIG. 2 is a cross sectional side view of a prior art annular-type combustor.
Figure 3:
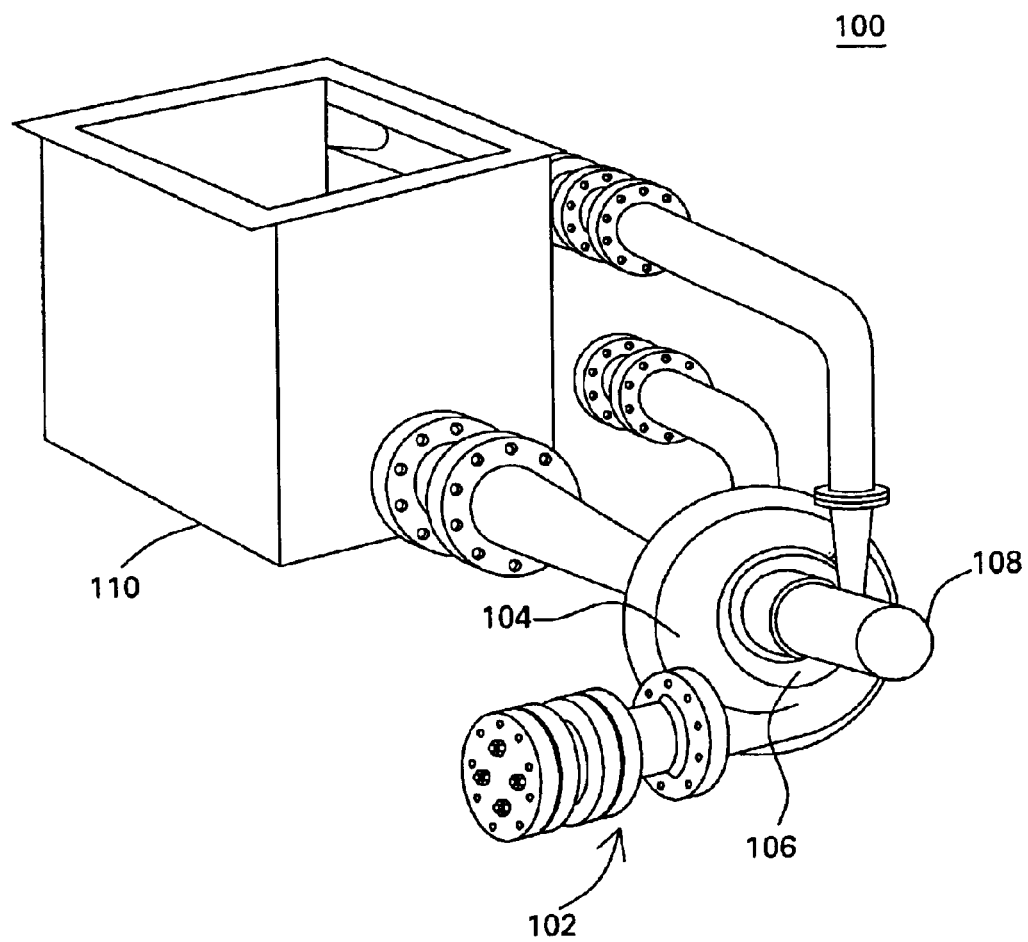
FIG. 3 is a perspective view of a recuperated microturbine.

Referring now to FIG. 3, there is shown a perspective view of a recuperator microturbine 100. The microturbine 100 generally includes a reverse flow can-type combustor assembly 102, a turbine scroll 104, a compressor volute 106, a generator 108, and a recuperator 110.

In operation, highly compressed air is delivered to the combustor assembly 102, mixed with fuel, and ignited. The fuel can be any type of fuel, e.g., liquid, gaseous, low BTU, and the like. The combustion gases are then expanded in the turbine scroll 104 to drive a turbine within the scroll, and are subsequently discharged through a conduit to recuperator 110. Rotation of the turbine by the expanded high-pressure gases can be converted to electrical energy by means of generator 108 in a manner generally known by those skilled in the art.

Figure 4:
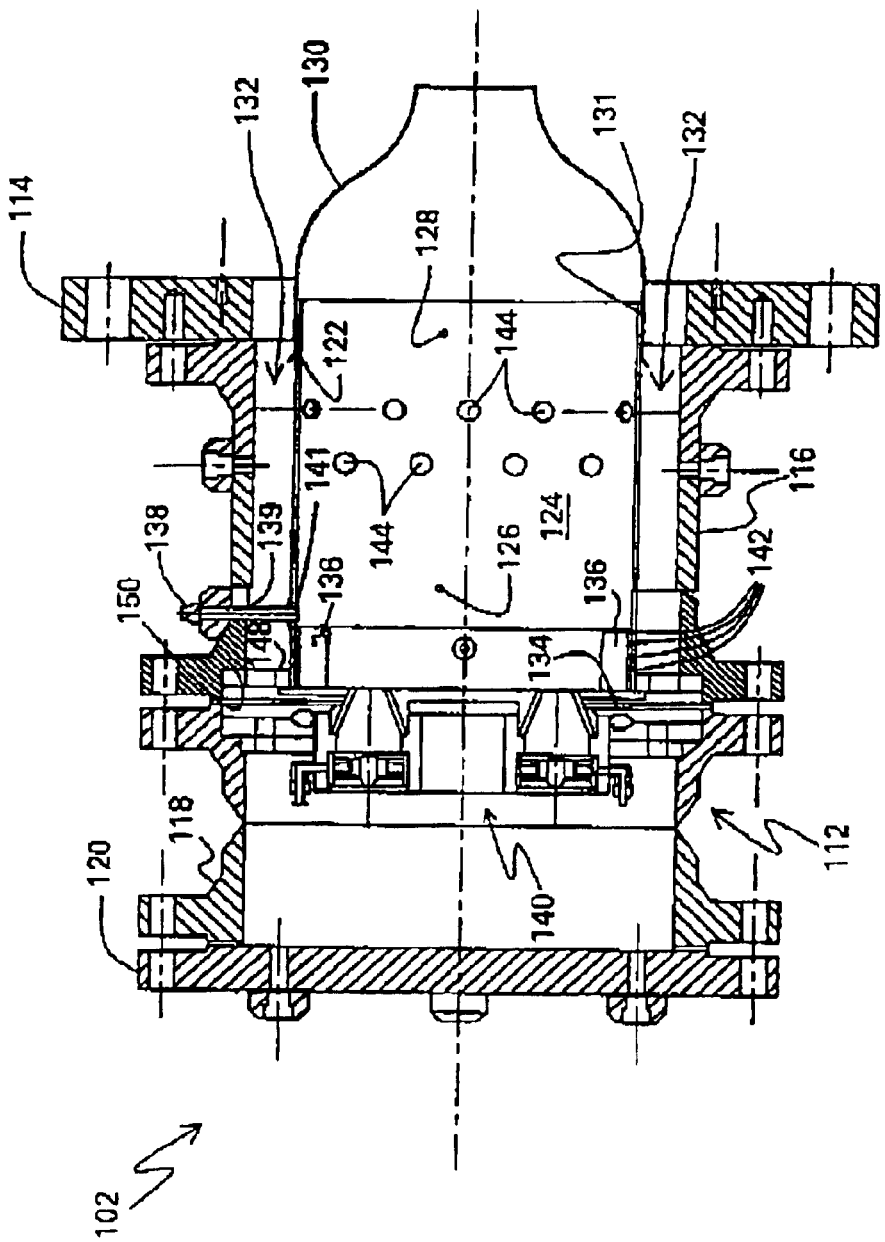
FIG. 4 is a cross sectional view of a reverse flow can-type combustor in accordance with the present disclosure.

FIG. 4 illustrates a cross section of the combustor assembly 102 shown in FIG. 3. Combustor assembly 102 cooperates with a compressor means (not shown) in driving the gas turbine (e.g., housed within the turbine scroll 104 in FIG. 3) that is fluidly coupled to the combustor assembly 102 (not shown). Combustor assembly 102 comprises a cylindrical outer combustor casing 112 that has one or more inlet(s) for supplying fluids to the combustor assembly 102. Casing 112 is preferably comprised of multiple sections 114, 116, 118 that can be bolted together or otherwise secured. As will be discussed, the use of multiple sections can be used to abuttingly secure the various flanges of components disposed within the combustor casing 112. An end cap 120 (also referred herein to diffuser cap) is preferably bolted to one end of the combustor casing 112 at an end distally positioned from the turbine scroll 104. In this manner, reverse flow (i.e., counter-flow) within the combustor assembly 102 can occur during operation of the turbine 100, as will be described in greater detail below.

Figure 5:
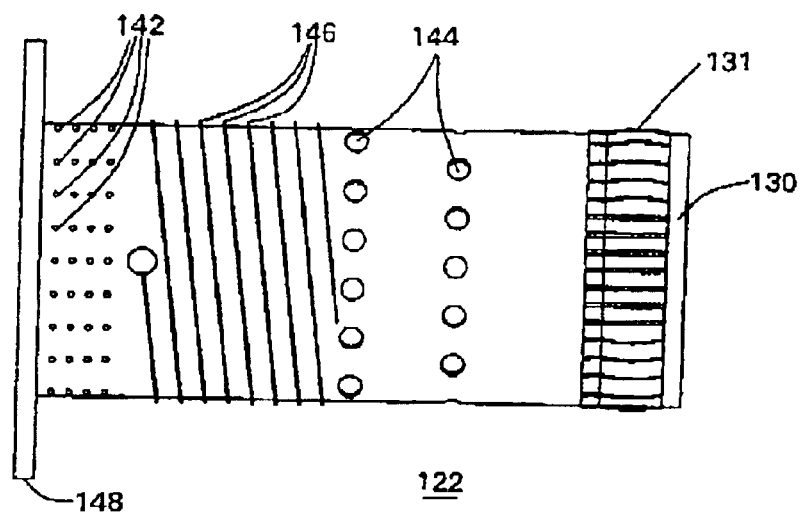
FIG. 5 is a side view of a combustor liner.

Disposed within the outer combustor casing 112 is a cylindrically shaped combustion liner 122, which defines a cylindrically shaped combustion chamber 124 therein, i.e., a can-type combustor. FIG. 5 illustrates a side view of the combustor liner 122. The combustor liner 122 generally includes a primary interior zone where the combustion flame is generated and a dilution zone downstream from the primary interior zone. A plurality of openings 142 are radially disposed in the liner 122, which generally defines the primary zone, and dilution holes 144 radially circumscribe the combustor liner 122 to generally define the dilution zone. Openings 142 advantageously provide impingement air to heat shield 136 during operation as will be described in greater detail below. Downstream, the dilution holes 144 provide a plurality of dilution jets so as to reduce the average temperature and minimize hot spots near the wall of the liner 122 so that an acceptable combustion pattern factor on the exit plane of the combustor liner 122 can be obtained. A plurality of ribs 146 circumscribing the liner 122 forms a turbulator for heat transfer and stiffens the liner. The combustor liner 122 further includes a flange 148 for abuttingly securing the liner 122 in an annular recess 150 of the casing 112 (see FIG. 4). The combustor liner 122 may further include additional openings, e.g., 152, for igniters, igniter cross fire tubes, and the like.

As shown in FIG. 4, the combustion chamber 124 has an upstream end 126 and a downstream end 128. The flow of combustion products exiting the downstream end 128 of combustion chamber 124 enters a transition piece 130 or scroll, overlapped to an end of the combustion liner 122 via seal 131, also referred to as a hula seal, fixedly attached to an end of the combustion liner 122. Transition piece 130 is used to transition the circular cross-section of the combustion liner 122, through a nozzle (not shown), to a sector portion of a turbine inlet (not shown) so as to allow the flow of combustion products to enter the turbine, allowing the turbine to harness the energy of the combustion products to drive the turbine. In a preferred embodiment, the length of combustion liner 122 should be long enough to allow sufficient CO burnout in low load or low temperature operation before the combustion products exit into transition piece 130. A fluid passageway indicated by arrow 132 is defined by a space between the combustion liner 122 and casing 112. Fluid passageway 132 permits the reverse flow of a fluid such as air during operation of the turbine 100.

Figure 6:
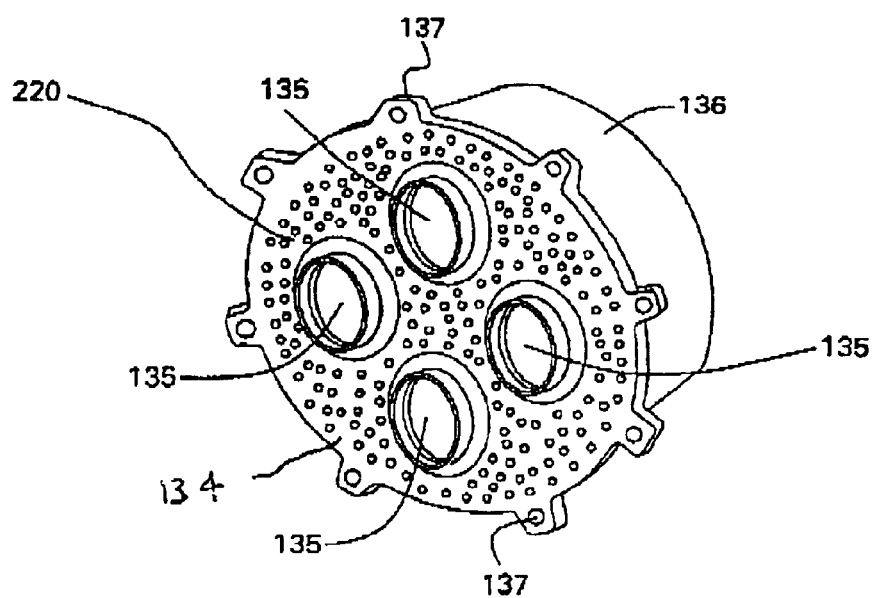
FIG. 6 is a perspective view of a domeplate and heat shield assembly.

The combustor assembly 102 further includes a domeplate 134 disposed at the upstream end 126 of and adjacent to the combustor liner 122. FIG. 6 illustrates a more detailed perspective view of domeplate 134. As shown, the domeplate itself 134 is generally planar and circular in shape. The domeplate 134 includes through-holes 137 in an outer flange 143 for securement to flange 148 of the combustion liner 122 during assembly of the combustor assembly 102. In a preferred embodiment, the domeplate 134 includes four annularly arranged openings 135 as shown and described herein, each one of the openings corresponding in number to the swirler and mixer assemblies employed within the combustor assembly 102. However, it is noted that the present disclosure is not intended to be limited to the four annularly arranged openings, which is dependent upon the number of swirler and mixer assemblies employed within the combustor assembly 102. Preferably, greater than two swirler and mixer assemblies are employed, wherein the maximum number is limited by space constraints as well as costs. In addition, domeplate 134 includes a plurality of fluid passageways 220 for permitting fuel and/or air to pass therethrough as will be described in greater detail below. The fluid passageways 220 are relatively small compared to the annularly arranged openings 135. A heat shield 136 is integral with or fixedly attached to one of the major planar surfaces of the domeplate 134. Preferably, heat shield 136 is cup shaped having a stem portion fixedly attached to each one of the annularly arranged openings 135 in the dome plate 134. Referring back to FIG. 4, the heat shield 136 is then oriented downstream facing the combustion chamber 124 and the annular array of the swirler and premixer assemblies, shown generally at 140, is disposed upstream. The heat shield 136 includes an annular endbody to insulate the combustor liner 122 from flames burning in the inner primary combustion zone.

An igniter 138 extends through combustor casing 112 and liner 122 through openings 139, 141 and is disposed downstream from the heat shield 136. The domeplate openings 220 and the combustion liner openings 142 cooperate such that such that during operation air flow through these openings 142, 220 directly impinge the outer surface of heat shield 136 at an angle substantially perpendicular to the heat shield 136, which is then mixed with the fluid flow downstream of the flame in the combustion chamber 124, thereby providing a secondary means for reducing the equivalence ratio.

Figure 7:
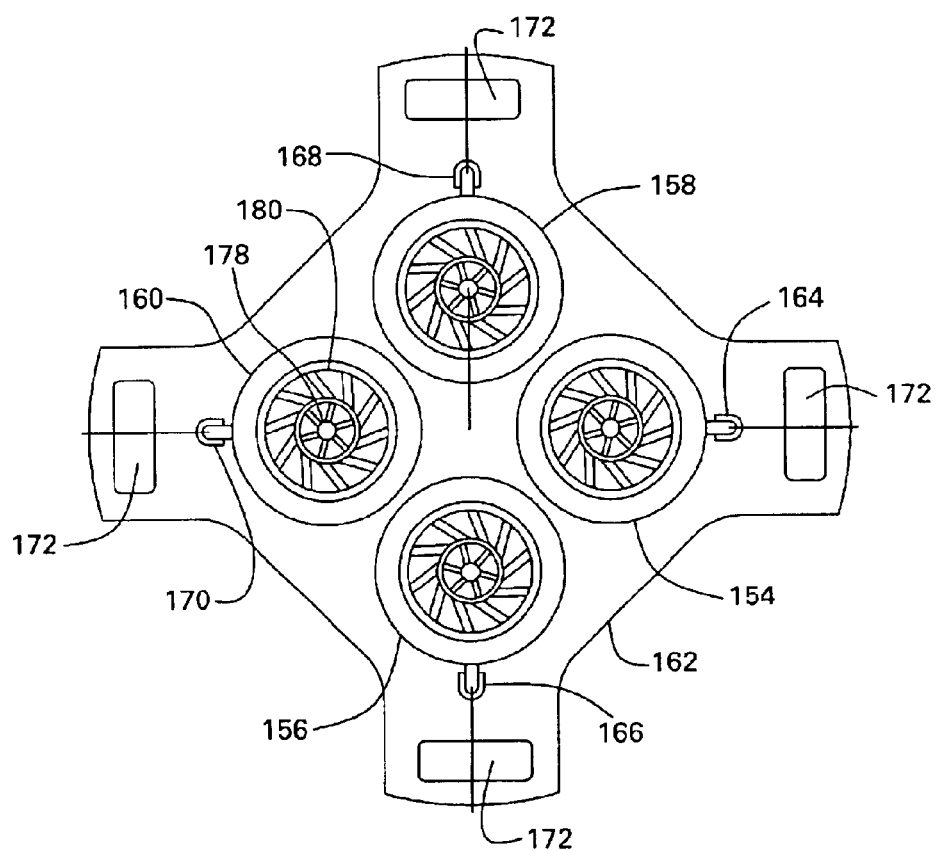
FIG. 7 is a plan view of a swirler and premixer assembly for use with a can-type combustor.

As shown more clearly in FIG. 7, the swirler and premixer assembly 140 comprises four annularly arranged swirler and mixer assemblies generally designated 154, 156, 158, and 160 radially disposed equidistantly about a central axis of plate 162. Although preference is given to the four annularly arranged swirler and mixer assemblies as shown, other annular swirler and mixer assembly arrangements can be used to provide the desired combustion pattern. Each annular swirler and mixer assembly includes a fuel nozzle 164, 166, 168, 170, respectively that can be independently operated so as to adjust the primary amount of fuel in the fuel/air mixture, thereby providing a means for reducing overall emissions of NOx during different operating conditions, e.g., full speed, full load, low load, low speed, turndown, and the like. Delivery of fuel through nozzles 164, 166, 168, and 170 define a primary fuel delivery system. In addition, because the combustor assembly 102 employs a can-type combustor liner, emissions of CO and UHC can be minimized due to the longer residence times in the combustion chamber 124 relative to annular type combustors. Plate 162 further includes through-holes 172 for securing the swirler and premixer assemblies 140 to casing 112.

Figure 8:
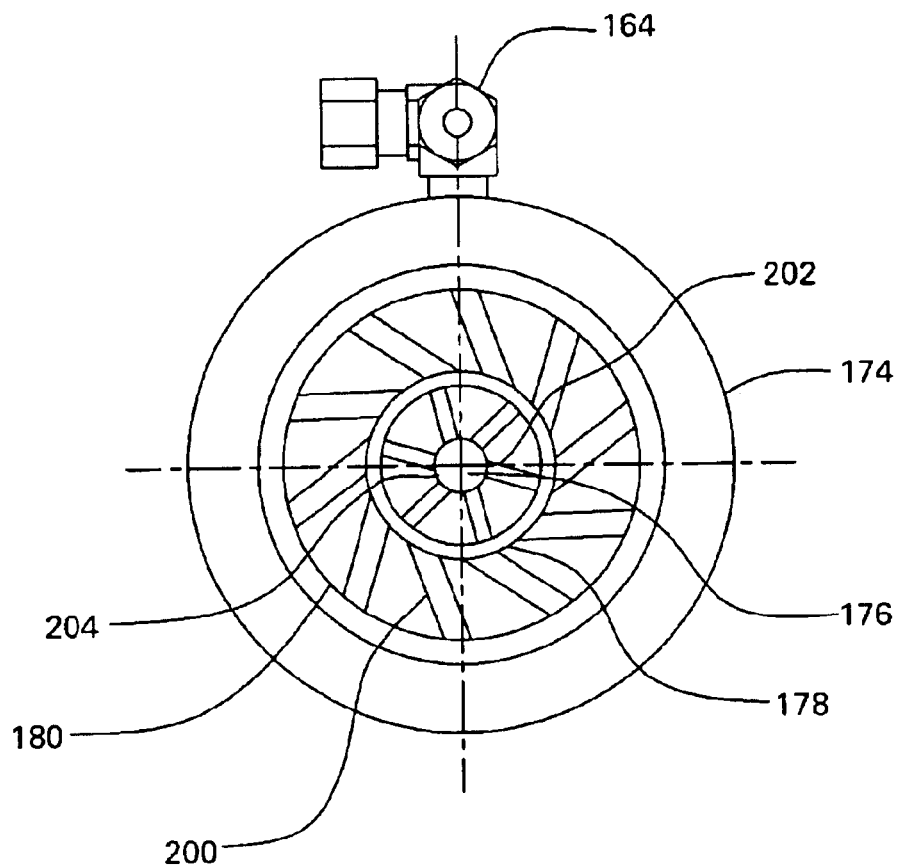
FIG. 8 is a plan view of a single swirler and mixer.
Figure 9:
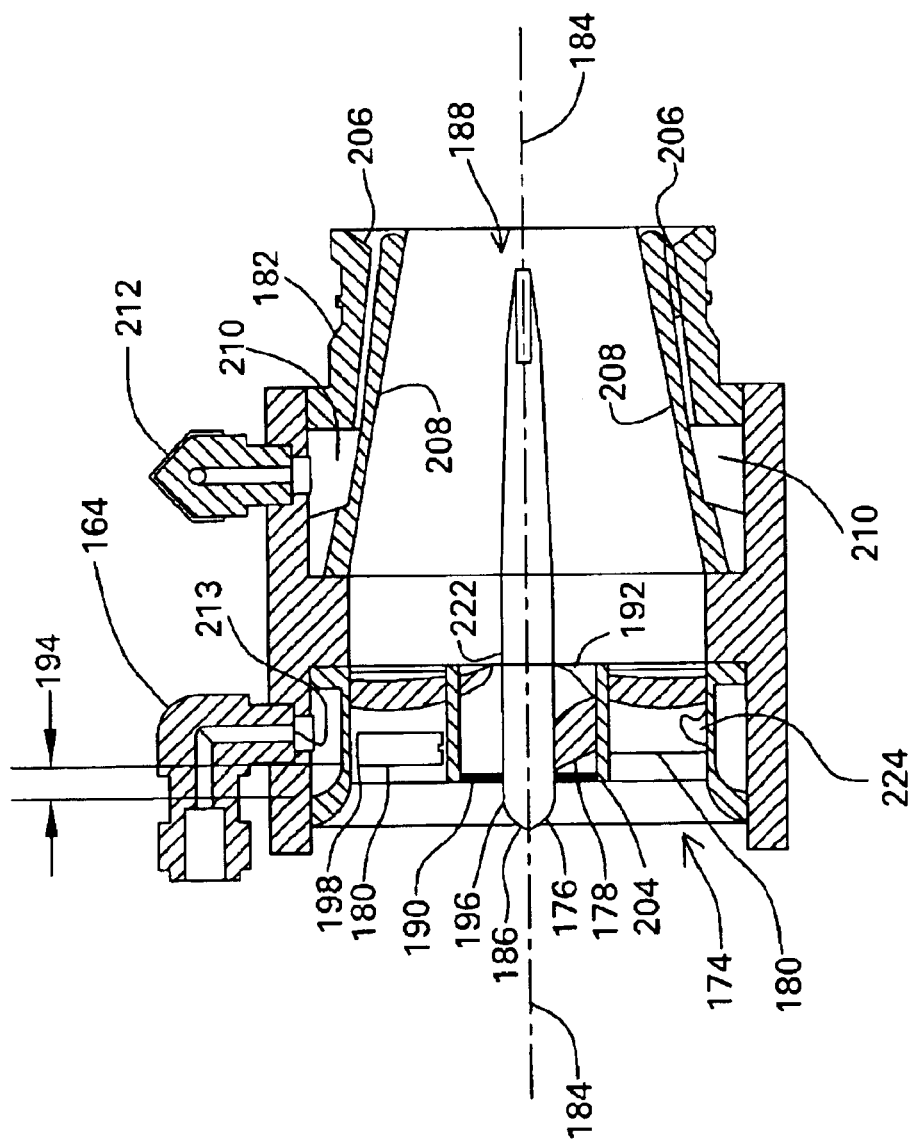
FIG. 9 is a cross sectional view of a single swirler and mixer.

FIGS. 8 and 9 illustrate cross sectional and plan views of a single swirler and premixer assembly (e.g., 154 or 156 or 158 or 160). Each assembly includes a premixer cup 174 to permit uniform mixing of fuel and air therein and to channel the fuel/air mixture into combustion chamber 124. Each premixer cup 174 includes a centerbody 176, an inner swirler 178, an outer swirler 180, and an axis of symmetry 184 extending from an upstream side 186 to a downstream side 188. A shroud 182, i.e., a converging mixing duct, is disposed downstream from the swirler and mixer assembly. A fuel nozzle, e.g., 164, is in fluid communication with openings 224 in a wall housing the outer swirler 180. In this manner, fuel can be simultaneously injected radially and substantially perpendicular to the outer swirlers 180 as will be described in greater detail below.

Each inner swirler 178 is secured to centerbody 176 radially outward from centerbody 176, wherein the inner swirler includes leading edge 190 and a trailing edge 192. Securement may be by any means including slip fitting, spot welding, epoxy bonding, and the like. Each outer swirler 180 is secured to the inner swirler 178 radially outward from inner swirler 178. Outer swirler 180 is attached such that the inner swirler leading edge 190 is a distance 194 upstream from a leading edge 198 of outer swirler 180. Furthermore, when outer swirler 180 is attached, centerbody 176 is positioned such that centerbody leading edge 196 is approximately co-planar with inner swirler leading edge 190 and distance 194 upstream from outer swirler leading edge 198. It is preferred that the foremost portion of the centerbody 176 is conical shaped as shown.

Inner and outer swirlers 178, 180, respectively, are preferably configured such that the flow within each swirler is counter-rotating with respect to one another. A hub 204 separates each inner swirler 178 from each outer swirler 180. As shown more clearly in FIG. 8, swirlers 178 and 180 typically have outer swirl vanes 200 and inner swirl vanes 202, respectively, each at an angle in the range between about 40° to about 60° with respect to a longitudinal axis 184 through the center of the swirler and mixer assembly. The ratio of air mass flowing in inner swirler 178 and in outer swirler 180 is typically about 1:3. This air mass ratio yields effective mixing of fuel and air (due to the above-mentioned counter-swirl) within the shroud 182 downstream from the swirlers 178, 180 and yet has sufficient residual swirl (corresponding to the higher air mass fraction of the outer swirlers) for adequate flame stability in the combustor.

The centerbody 176 may be a straight cylindrical section or alternatively, one in which the surfaces coverage substantially uniformly from an upstream end to a downstream end. Preferably, centerbody 176 is disposed co-axially with the assembly axis of symmetry 184. As previously discussed, the leading edge of the centerbody is preferably conically shaped for airflow purposes. In one embodiment, centerbody 176 is cast within premixer cup 174 and sized so as to terminate immediately prior to the downstream end of the shroud 182. Optionally, the centerbody 176 can house a liquid fuel delivery system, not shown here, for dual-fuel capabilities.

Shroud 182 preferably includes annularly tapered walls 208, which tapers uniformly from the forefront of the shroud 182 to the domeplate 134 as shown to increase flow velocities within shroud 182. Because shroud 182 converges, a fuel/air mixture flowing within shroud 182 is accelerated, which helps to minimize boundary layers from accumulating within shroud 182 and thus, minimizes flashbacks stemming therefrom. Shroud 182 further includes a fuel plenum 210 radially disposed about the shroud. A plurality of fluid passageways 206 is formed within the shroud 182 extending from the plenum 210 to the combustion chamber 124. In this particular configuration, each swirler and mixer assembly preferably includes eight such fluid passageways. The fuel plenum 210 and fluid passageways 206 extending therefrom are in fluid communication with the secondary fuel nozzles, e.g., the combination of elements 212, 214, 216, and 218 {as described in further detail below} to define a secondary fuel system.

Figure 10:
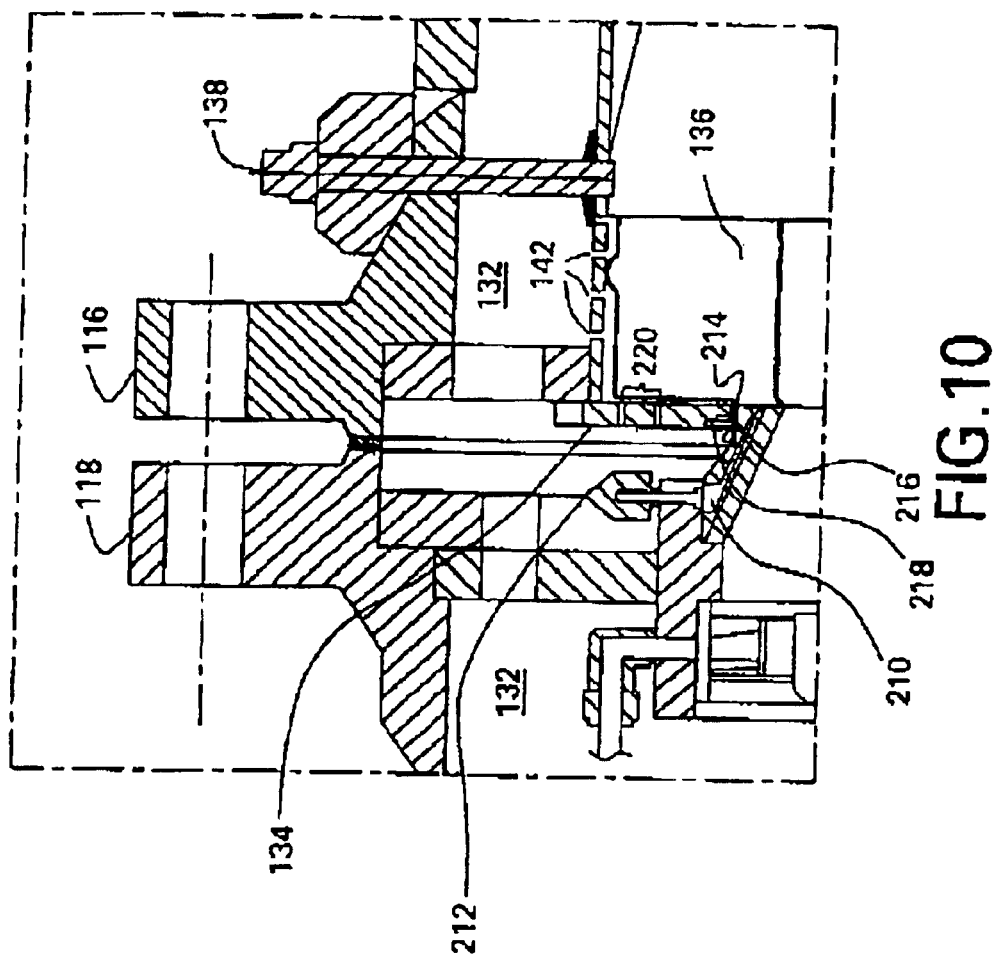
FIG. 10 is an enlarged cross sectional view illustrating a secondary fuel delivery system and air impingement pathways for cooling the heat shield.

FIG. 10 illustrates an enlarged section of a portion of the combustor assembly 102 to more clearly show the secondary fuel delivery system as well as the openings 142, 220 in the dome plate 134 and liner 122, respectively, for air impingement on the outer surface of the heat shield 136. In addition, FIG. 10 illustrates an L-shaped ferrule 216 trapped in a recess formed in domeplate 134. A ferrule retainer 218 preferably retains the ferrule 216 to permit movement thereof The movement of the ferrule 216 between the domeplate 134 and an exterior wall defining the shroud 182 permits relative motion between these components while defining an adjustable fluid passageway 214, which is in fluid communication with fluid passageway 132. In this manner, fluid, e.g., air, flowing through fluid passageway 132 can flow into the combustion region by the passageway controlled by the movement of ferrule 216.

A fuel manifold system (not shown) fluidly communicates with the primary and secondary fuel delivery systems via the fuel nozzles (i.e., primary system fuel nozzles 164, 166, 168, and 170; and secondary system fuel nozzles 212, 214, 216 and 218 described herein). As previously discussed, the primary fuel delivery system delivers fuel substantially perpendicular to the outer swirler 180. The secondary fuel delivery system delivers fuel via the plenum 210 and fluid passageway 206 formed in shroud 182. Reverse air flows through the combustor assembly 102 primarily through fluid passageway 132. Secondary air flows through fluid passageway 214. Each primary and secondary fuel delivery system is preferably independently controlled. Optionally, a portion of the primary and secondary fuel delivery systems for the various swirler and mixer assemblies are independently controlled. In this manner, all or a portion of the swirler and mixer assemblies can be operated at different equivalence ratios such that different flame temperatures can be individually achieved. As a result, emissions at different loads including full speed and full load conditions can be controlled.

The manifold system generally includes a plurality of fuel conduits extending between a fuel source (not shown) and the various fuel nozzles described. For example, fuel nozzle 164 or the like communicates with the outer swirler 180 to define a portion of the primary fuel delivery system. The primary fuel delivery system injects fuel radially into the outer swirler 180 via sidewall openings 224, respectively. The shroud 182 has a secondary fuel delivery system that delivers fuel in a diffusion flame manner via a plurality of openings 142 (and regulated by ferrule 216). Fuel nozzle 216 communicates with the manifold to inject fuel into fluid passageway 206 defined by the shroud 182. The primary and secondary fuel delivery systems can be varied such that the combined fuel flow corresponds to the required equivalence ratio for a fixed flame temperature. Advantageously, each of the swirler and premixer assemblies (154, 156, 158, 160) can operate at different equivalence ratios to generate emissions that are compliant with regulations per combustor and achieve stability of operation and low combustion dynamics. Ignition is achieved in the combustor by means of the igniter 138. If multiple combustion chambers are needed on a particular gas turbine engine, cross fire tubes may be employed in the usual manner as is known to those in the art.

In operation, compressed air is directed via a reversed flow or co-flow towards the end cap 120, where the compressed air splits into combustion air via the premixers 154, 156, 158, 160, domeplate 134 and heat shield 136 impingement air via openings 146 and 142, and dilution air via openings 144. The domeplate and heat shield impingement air impinge on the outer surface of the heat shield 136 at an angle substantially perpendicular to the airflow and mix further downstream with the combustion gases. The combustion air is premixed with the premix fuel by means of the inner and outer swirler, e.g., 178, 180, respectively, and delivered to the flame front. The shroud 182 has a secondary fuel circuit that delivers the pilot fuel in a diffusion flame manner via a number of openings at the shroud tip. The two fuel delivery systems preferably operate and are controlled independently. For a fixed flame temperature, each swirler and premixer assembly can be operated independently such that the combined fuel flow corresponds to the required equivalence ratio. Thus, each swirler and mixer assembly (four as shown) can operate at different equivalent ratios to generate emissions that are compliant with regulations per combustor and achieve stability of operation and low dynamics. The remaining air (dilution air) is directed towards the openings 144 for heat transfer purposes so as to minimize NOx emissions that normally occur at higher temperatures.

Because a fuel/air mixture supplied to combustor assembly 102 contains more air than is required to fully combust the fuel, and because the air is mixed with fuel prior to combustion, the combustor is a lean premix combustor. Accordingly, a fuel/air mixture equivalence ratio for the combustor is preferably less than one.

The following examples are provided to illustrate some embodiments of the present disclosure. They are not intended to limit the disclosure in any aspect.

EXAMPLE 1

Figure 11:
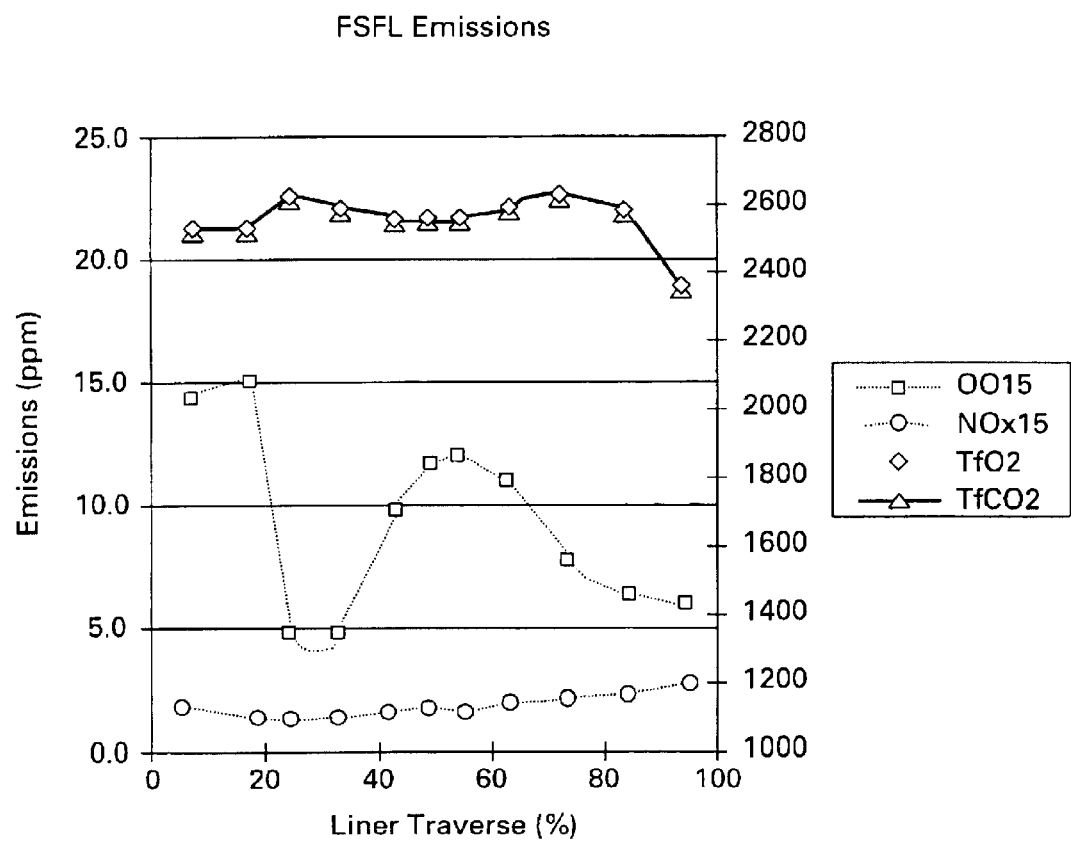
FIG. 11 graphically illustrates CO and NOx emissions across the combustor liner at full speed and full load of the microturbine of FIG. 3.

In this example, emissions were monitored for a turbine shown in FIG. 3 employing a can type combustor in accordance with the present disclosure. Emissions were monitored at various points across the combustor liner during operation of the microturbine at full speed and, full load (FSFL). As is graphically shown in FIG. 11, a NOx emission was less than about 3 parts per million (ppm) across the entire combustor liner. Although the residence time in the can type combustor is relatively long compared to annular type combustors, the independently operated premixers employed in the can type combustors provides a robust process with minimal NOx emissions and minimal dynamic pressure fluctuations. Levels of carbon monoxide at FSFL averaged less than about 10 ppm across the combustor liner. During low load and/or low temperature operation, the levels of carbon monoxide (CO) and unburned hydrocarbons are expected to be minimal due to the compact flame structure and long combustor residence time.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A reverse flow combustor for a gas turbine, comprising
a cylindrical shaped combustor casing comprising an end cap disposed at one end and an open end in fluid communication with the gas turbine;
a cylindrical combustor liner disposed in the casing interiorly defining a combustion chamber and exteriorly defining a reverse flow fluid passageway between the casing and the liner;
a swirler and mixer assembly upstream from the combustion chamber, wherein the assembly comprises annularly arranged swirler and mixers, wherein each one of the annularly arranged swirler and mixers comprises a centerbody, an inner swirler attached to the centerbody, an outer swirler attached to the inner swirler and a shroud comprising an annularly tapered wall extending between each one of the swirler and mixers and the combustion chamber;
a domeplate intermediate the combustion chamber and the swirler and mixer assembly;
a primary fuel delivery system comprising a fuel source in fluid communication with each one of the swirler and mixers, wherein the primary fuel system is adapted to radially inject fuel into the outer swirler; and
a secondary fuel delivery system comprising a fluid passageway in the annularly tapered wall of the shroud, wherein the fluid passageway is in fluid communication with the fuel source, wherein the primary and secondary fuel delivery system can be independently controlled for each one of the four swirler and mixers.

2. The reverse flow combustor according to claim 1, wherein the assembly comprises four annularly arranged swirler and mixers.

3. The reverse flow combustor according to claim 1, wherein the domeplate further comprises a heat shield attached thereto, wherein the heat shield comprises an annular endbody.

4. The reverse flow combustor according to claim 3, wherein the domeplate further comprises a plurality of fluid openings to provide an airflow that impinges upon an outer surface of the heat shield during operation of the gas turbine.

5. The reverse flow combustor according to claim 3, wherein the cylindrical combustor liner comprises a plurality of openings about a primary combustion zone to provide an airflow that impinges upon an outer surface of the heat shield during operation of the gas turbine.

6. The reverse flow combustor according to claim 1, wherein each one of the annularly arranged swirler and mixer assemblies are equidistant about a central longitudinal axis point of the combustor casing.

7. The reverse flow combustor according to claim 1, wherein each one of the inner and outer swirlers are counter-rotating with respect to one another.

8. The reverse flow combustor according to claim 1, wherein multiple combustors are installed on an axial turbine machine with cross-firing capability.

9. The reverse flow combustor according to claim 1, wherein the combustor is connected to a turbine scroll via a seal.

10. The reverse flow combustor according to claim 1, wherein the seal is a hula seal.

11. The reverse flow combustor according to claim 1, wherein the shroud comprises a plenum in fluid communication with a fuel nozzle for introduction of a fuel from the fuel source, wherein the plenum is in fluid communication with the fluid passageway in the annularly tapered wall of the shroud.

* * * * *